United States Patent [19]
Frisby et al.

[11] 3,782,516
[45] Jan. 1, 1974

[54] FLUID CLUTCH
[75] Inventors: Paul W. Frisby; Edward P. Stanny, both of Salt Lake City, Utah
[73] Assignee: McGraw-Edison Company, Elgin, Ill.
[22] Filed: Oct. 27, 1972
[21] Appl. No.: 301,487

[52] U.S. Cl. ........ 192/88 A, 192/70.28, 192/85 AA
[51] Int. Cl. ..................... F16d 13/48, F16d 25/04
[58] Field of Search ..................... 192/88 A, 85 AA, 192/70.16, 70.28; 188/366, 367, 368

[56] References Cited
UNITED STATES PATENTS

| | | | |
|---|---|---|---|
| 2,620,814 | 12/1952 | Hobbs | 192/85 AA |
| 3,163,274 | 12/1964 | Bowerman et al. | 192/88 A |
| 2,745,435 | 5/1956 | Hobbs | 192/88 A X |
| 2,940,572 | 6/1960 | Warman | 188/366 X |
| 2,608,275 | 8/1952 | Hobbs | 188/366 |

Primary Examiner—Benjamin W. Wyche
Assistant Examiner—Lance W. Chandler
Attorney—Charles F. Lind

[57] ABSTRACT
A fluid clutch having a diaphragm defining within a housing a fluid tight chamber, a clutch shaft having a disc keyed thereto for rotation in the housing adjacent the diaphragm but on the exceed thereof opposite from the chamber, a pair of friction elements adjacent and sandwiching the disc and means precluding rotation of the friction elements while allowing axial movement thereof, a thrust plate between the diaphragm and adjacent friction element, and means for communicating fluid pressure to the chamber to flex the diaphragm sufficiently to bind the disc between the friction elements and against rotation relative to the housing.

In the transmission of rotary shaft power, a clutch is frequently used for selectively connecting together or releasing a driving member and a driven member. The output requirement of such a clutch can exceed 1000 inch pounds of torque at over 1,000 revolutions per minute Moreover, many such clutches are needed since some industrial type machines might require that many pairs of driving and driven members be selectively connected together, and two or even three clutches might be connected in parallel between each pair for controlled drive of the driven member in either direction or total braking of the same.

8 Claims, 2 Drawing Figures

FLUID CLUTCH

This invention relates to a fluid clutch which is economical to fabricate and easy to assemble, which is rugged in use and easy to maintain, and which has a high output to size ratio.

An object of this invention is to provide a low-cost high output clutch which can be operated either by a pneumatic system with oil moist or unfiltered air or by a hydraulic system. A more specific object of this invention is to provide a fluid clutch having a pair of friction elements sandwiching a clutch disc and a thrust plate operated by a flexing diaphragm to bind or release the clutch disc relative to the friction elements.

Figure 1:
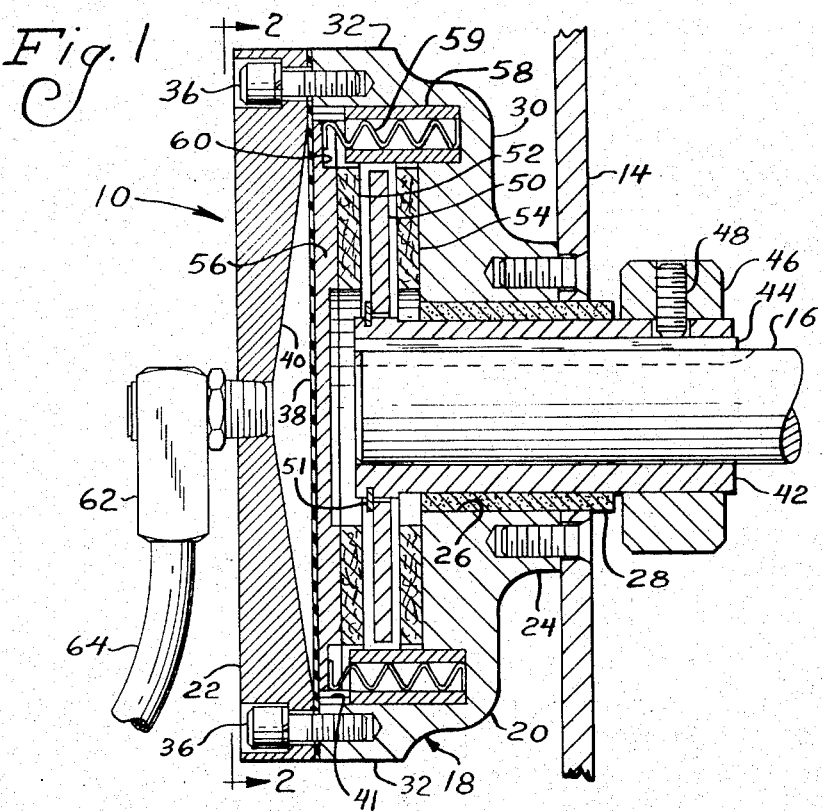
Figure 2:
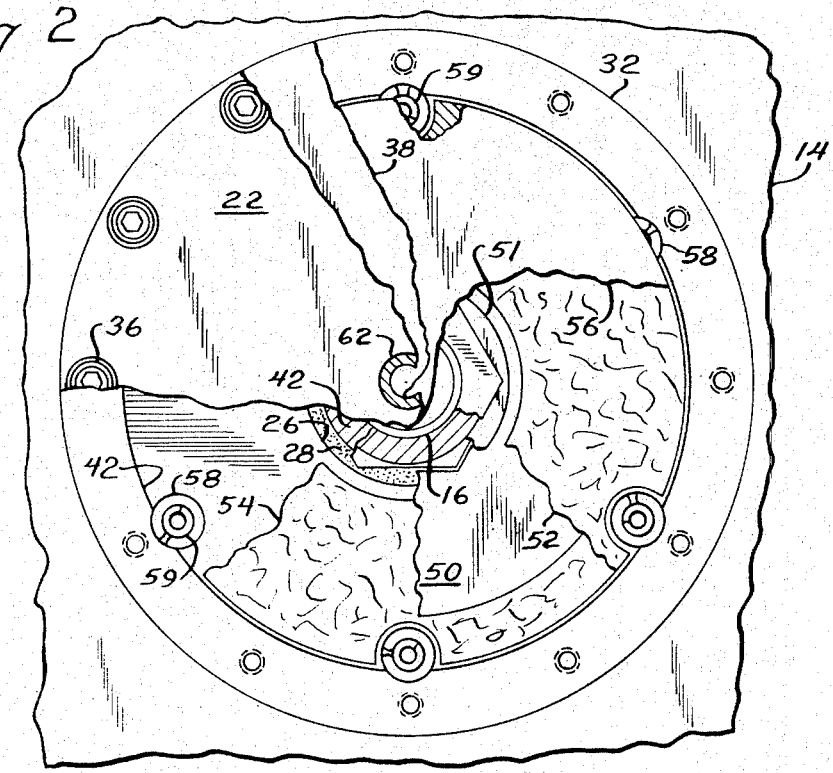

These and other objects of this invention will be more fully understood and appreciated after referring to the following specification, the accompanying drawing forming a part thereof, wherein:

FIG. 1 is a center sectional view of a preferred embodiment of the disclosed fluid clutch; and FIG. 2 is a view as seen generally from line 2—2 in FIG. 1, except showing the clutch with various of its components broken away for clarity of disclosure.

The fluid clutch 10 is operatively connected between wall element 14 and shaft 16 effective to allow the shaft 16 to be rotatably moved relative to the wall or to unite the wall and shaft together. Since the unit 10 can actually be used as a brake or clutch, as above noted, the manner of connection depends on the end purpose to be achieved. Thus, the shaft 16 might be the driving member rotated under power and the wall element 14 comprised in fact as a sprocket or pulley which upon engaging the clutch is likewise rotated as the driven member, or vice versa; or the wall element 14 might comprise in fact part of the machine frame which upon engaging the clutch brakes the shaft and prevents rotation thereof relative to the frame.

The unit 10 has a housing 18 defined by two components including cup-shaped component 20 and cap 22. The housing component 20 has a hub 24 with opening 26 for receiving a sleeve bearing 28 and has a radial wall 30 and circumferential wall 32 terminating in a smooth annular face to which the housing component 22 is secured by bolts 36. A diaphragm element 38 is confined between the cooperating faces of the housing components 20 and 22 and defines a chamber 40 adjacent the cap 22 and a cavity 41 adjacent the component 20.

A clutch shaft 42 is journaled in the bearing 28, and the clutch shaft has a bore which fits on shaft 16 and a keyway combination 44 prevents any rotation between them. Annular collar 46 fits over the protruding end of the clutch shaft and set screw 48 tightened down through an opening in the clutch shaft holds the clutch shaft secured to the shaft 16 and further limits inward axial displacement of the clutch shaft by abutment against the bearing 28. A radial disc 50 is keyed to the clutch shaft 42 near its inner end having some free clutch shaft 42 near its inner end having some free floating both axially and angularly of the shaft. A hex shaped shaft contour and slightly larger hex opening in the disc provides the free floating keying, while retaining ring 51 fitted in a groove on the clutch shaft limits disc 50 movement along the clutch shaft and further prevents clutch shaft removal from the housing.

A pair of annular friction discs 52 and 54 are positioned over the clutch shaft in opposing relation to the clutch disc 50 and are adapted to freely float on roll pins 58 fitted through openings therein. The roll pins are confined in a cantilevered fashion in open bores in the radial wall of the housing component 20. The friction discs thus cannot rotate within the housing although they can be moved axially of the shaft 42. A thrust plate 56 is located between the diaphragm 38 and the adjacent clutch disc 52 where the thrust plate 56 has a flat smooth surface adjacent the diaphragm 56 and has a plurality of partial cutouts 60 extending only partway across the width of the plate which cutouts form receiving seats for compression springs 59 constrained in the pins 58. The springs 59 tend to bias the clutch to its non-engaged position where no appreciable drag is on the clutch disc 50.

In the preferred design, the housing components 20 and 22 could be fabricated of a cast aluminum while the clutch shaft 42, clutch disc 50, the thrust plate 56 and roll pins 58 could be made of a steel of moderate quality for strength and durability and for good dissipation of heat away from the diaphragm 38.

The friction disc members 52 and 54 are made of a woven friction material or can be made, if desired, of any carbon graphite clutch material capable of being subjected to a drag and sliding friction without rapid wear or excessive development of heat. The diaphragm is flexible and impervious, typically being woven from blends of temperature resistant silicone, rubber and fiberglass and/or nylon.

A swivel socket 62 is connected to a tap in the cap housing component 32 aligned axially of shaft 42 and fluid line 64 connects the source of operating fluid with the diaphragm chamber 40, to allow rotation of the housing about the shaft. Cavity 41 is vented as through one or more small holes (not shown) drilled through the circumferential wall 32. The unit 10 is secured by bolts 61 to the wall 14, which wall has the opening therein to receive the clutch shaft 42.

The operation of the device provided that increased fluid pressure in the chamber 40 displaces the diaphragm 38 to the right as shown in FIG. 1 and this likewise displaces the thrust plate 56, friction disc 52 and the clutch disc 50 until they bottom against the friction disc 54 and radial wall 30. This pinches and thereby causes a frictional drag against the clutch disc 50, and if the device 10 is of sufficient capacity unites for common rotational movement or for common stationary operation the clutch housing 18 and the shaft 16. Upon release of the pressure in the chamber 40 the thrust plate 56 is biased to the release position bottomed against the cap 22 and the friction discs 52 and 54 are permitted to separate and release the frictional drag of the clutch disc.

It will be noted that all friction members are isolated from the source of power fluid thus allowing the use of an oil lubricated air or unfiltered and moist air. Moreover, the wear on the freely floating friction elements and clutch disc should be only nominal and uniform and sustained operation is possible because heat buildup from friction is reduced by rapid dissipation through the housing components and thrust plate.

We claim:

1. A fluid clutch, comprising a housing formed of two components secured together, a diaphragm supported annularly between the components and defining within the housing on opposite sides of the diaphragm a working cavity open to one of the components and a chamber open to the other of the components, the one housing component having a bore open to the working cavity, a bearing received in the bore, a shaft supported for rotation within the bearing, a radial disc and means keying the disc to the shaft for common rotation therewith within the working cavity while allowing disc movement axially of the shaft, a pair of friction elements disposed adjacent and sandwiching the radial disc, a thrust plate disposed between the diaphragm and the adjacent friction element, means precluding rotation of the friction elements while allowing axial movement of the said adjacent element within the housing relative to the other, and means for communicating fluid pressure to the chamber sufficient to displace the thrust plate against the adjacent friction element and to bottom the friction elements against the housing operable to trap the radial disc there between.

2. A fluid clutch according to claim 1, wherein a plurality of pins are secured in the housing and fit freely through openings in the friction elements to serve as the said means precluding rotation of the friction elements.

3. A fluid clutch according to claim 1, further including a plurality of springs located between the housing and thrust plate normally urging the thrust plate to the clutch disengaged condition.

4. A fluid clutch according to claim 3, wherein a plurality of pins are secured in the housing and fit freely through openings in the friction elements to serve as the said means precluding rotation of the friction elements, and further wherein the pins are hollow and receive and hold the said springs.

5. A fluid clutch according to claim 1, wherein the said shaft has a cylindrical portion received in said bearing and further has a polygonal portion that fits freely but closely within a correspondingly shaped opening in the radial disc serving too as the means keying the disc to the shaft.

6. A fluid clutch according to claim 5, wherein a collar is secured on the said shaft outside of the housing and a retaining ring is secured on the said shaft in the working space of the housing at a location between the thrust plate and radial disc operable to abut with the latter, and where nominal clearance is provided between the ring and collar and the adjacent radial disc and bearing, respectively, operable to allow the required shifting of the radial disc in the housing while also limiting axial movement of the said shaft relative to the housing.

7. A fluid clutch according to claim 1, wherein the means for communicating fluid pressure to the chamber includes a swivel element connected to the housing axially of the clutch shaft.

8. A fluid clutch according to claim 1, further including the combination of a second shaft and frame member, means on the housing for connection of the frame member to the housing, and means including a bore and keyway combination therefor concentrically in the first named shaft for keyed receipt of the second shaft.

* * * * *